(12) United States Patent
Wageman (10) Patent No.: US 9,706,266 B1
(45) Date of Patent: Jul. 11, 2017

(54) TELEPHONY CODEC OPTIMIZING METHOD AND APPARATUS

(75) Inventor: Anthony J. Wageman, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 2180 days.

(21) Appl. No.: 12/018,728

(22) Filed: Jan. 23, 2008

(51) Int. Cl.
*H04M 7/00* (2006.01)
*H04Q 3/00* (2006.01)

(52) U.S. Cl.
CPC .............. *H04Q 3/00* (2013.01); *H04M 7/00* (2013.01)

(58) Field of Classification Search
USPC .......................................................... 379/229
See application file for complete search history.

(56) References Cited

U.S. PATENT DOCUMENTS

| | | |
|---|---|---|
| 6,392,999 B1 | 5/2002 | Liu et al. |
| 6,445,697 B1 | 9/2002 | Fenton |
| 6,798,786 B1 * | 9/2004 | Lo .................. H04L 12/6418 370/329 |
| 6,839,356 B2 | 1/2005 | Barany et al. |
| 7,039,059 B2 | 5/2006 | Mizusawa et al. |
| 7,177,926 B2 | 2/2007 | Kramer |
| 7,751,359 B1 * | 7/2010 | Bienn et al. ............. 370/328 |
| 7,768,998 B1 * | 8/2010 | Everson et al. .......... 370/352 |
| 2004/0047437 A1 * | 3/2004 | Hamiti ............... H04L 69/24 375/326 |
| 2004/0240399 A1 * | 12/2004 | Corrao et al. ............ 370/260 |

* cited by examiner

*Primary Examiner* — Amal Zenati (57) ABSTRACT

A method for operating a communication system in a communication network for optimizing a codec selection between a calling device communication network and a called device communication network is provided. The communication system is configured to receive a call set-up message from the calling device communication network (wherein the call set-up message comprises an identity of an origination codec and a called number), determine an identity of a destination codec based upon the called number, communicate the identity of the destination codec to the calling device communication network, and establish a call between the calling device communication network and the called device communication network using the destination codec.

24 Claims, 10 Drawing Sheets

TELEPHONY CODEC OPTIMIZING METHOD AND APPARATUS

OVERVIEW

Modern communication system networks often comprise a number of separate sub-networks in communication with each other. These sub-networks are often owned and operated by different companies, use different equipment, and have different physical properties. When digital messages are passed through networks, they may traverse any number of different sub-networks. These digital messages are typically encoded by a transmitting device and decoded by a receiving device. A device or method that encodes and decodes digital messages is termed a "codec." There are a wide variety of codecs utilized currently and many devices are capable of utilizing several different codecs, depending on system requirements.

Different codecs may be used for different purposes. For example, a codec designed for audio data may use a different method for encoding and decoding data than a codec designed for video data. Also, due to network configuration differences and physical differences, different codecs may be used to optimize data transfer rates and accuracy within different networks. Thus, the selection of an optimum codec may be a factor affecting the performance of data transfer within a network.

TECHNICAL SUMMARY

A method for operating a communication system in a communication network for optimizing a codec selection between a calling device communication network and a called device communication network is provided. The communication system is configured to receive a call set-up message from the calling device communication network (where the call set-up message comprises an identity of an origination codec and a called number), determine an identity of a destination codec based upon the called number, communicate the identity of the destination codec to the calling device communication network, and establish a call between the calling device communication network and the called device communication network using the destination codec.

In another embodiment, an apparatus for optimizing a codec selection between a calling device communication network and a called device communication network is provided. The apparatus comprises a communication system, which in turn comprises a communication interface communicatively coupled with the calling device communication network, and a processing system communicatively coupled with the communication interface. The processing system is configured to operate the communication system to receive a call set-up message from the calling device communication network through the communication interface, (where the call set-up message comprises an identity of an origination codec and a called number), determine an identity of a destination codec based upon the called number, communicate the identity of the destination codec to the calling device communication network through the communication interface, and establish a call between the calling device communication network and the called device communication network using the destination codec.

In a further embodiment, a computer-readable medium having instructions stored thereon for operating a communication system to optimize a codec selection between a calling device communication network and a called device communication network is provided. The instructions, when executed by the communication system, direct the communication system to receive a call set-up message from the calling device communication network, (where the call set-up message comprises an identity of an origination codec and a called number), determine an identity of a destination codec based upon the called number, communicate the identity of the destination codec to the calling device communication network, and establish a call between the calling device communication network and the called device communication network using the destination codec.

DETAILED DESCRIPTION

Figure 1:
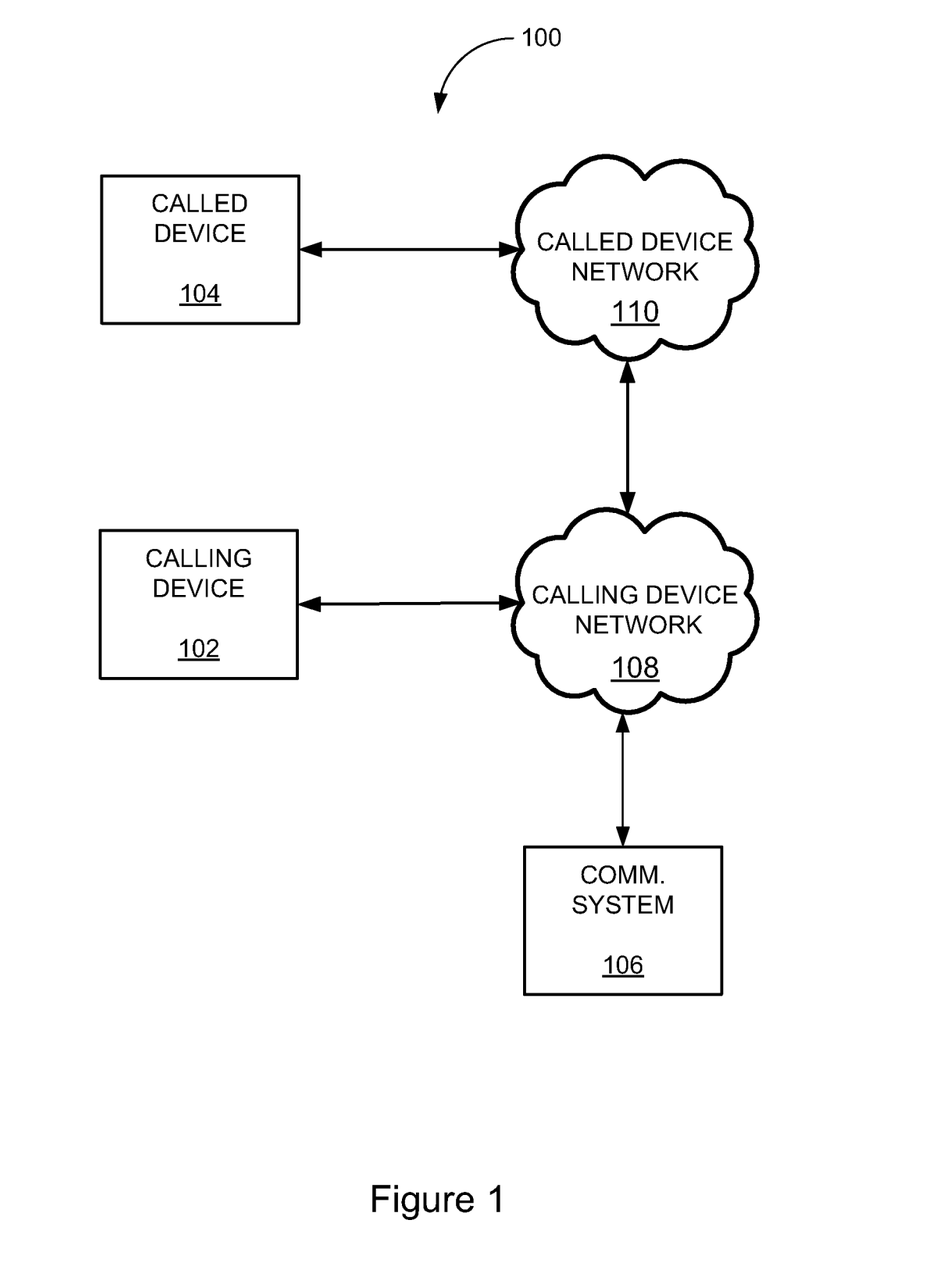
FIG. 1 is a block diagram illustrating a communication network.

FIG. 1 is a block diagram illustrating a communication network. In this example, communication network 100 comprises calling device 102, shown communicatively coupled with calling device network 108. Communication system 106 is also communicatively coupled with calling device network 108. Calling device network 108 is communicatively coupled with called device network 110, which is further communicatively coupled with called device 104. In this example, calling device 102 may be any telecommunication device capable of originating a call. Likewise, called device 104 is any telecommunication device capable of receiving a call, such as a code division multiple access (CDMA) handset. Calling device network 108 and called device network 110 may be any networks capable of carrying telecommunication messages, including such examples as the Public Switched Telephone Network (PSTN), the Internet, wireless networks, local area networks, wide area networks, or any other telecommunication capable network. In many cases calling device network 108 and called device network 110 may be owned or controlled by different business entities, they may have differing physical structures, and use differing communication protocols.

When digital data is carried on these networks, it typically is encoded at a source and decoded at a destination. The device or program doing this encoding or decoding is a termed a codec. There are a very wide range of codecs available for use in communication networks. Selection of an optimal codec may rely on such factors as the physical structure of the network, the communication protocols used on the network, the capabilities of the calling and called devices, or a wide range of other considerations.

Communication system 106 is configured to determine which codec to use for the call between calling device 102 and called device 104. This determination may be made by considering the origination codec from calling device 102, and the called number of called device 104. The codec selection may also be based on the characteristics of calling device network 108 and called device network 110, or on a voice path to the called device network.

Once a destination codec is selected for use in the call, the identity of the destination codec must be communicated to the calling device communication network, such that the call may be established between the calling device network 108, and the called device network 110 using the destination codec. Communication system 106 may determine the best codec for use in the call in any of a wide variety of methods. Communication system 106 may include in memory a codec table, such as the table illustrated in FIG. 5, for use in determining an optimum codec based on the called number. Other embodiments may use other methods for determining the optimum codec.

Figure 2:
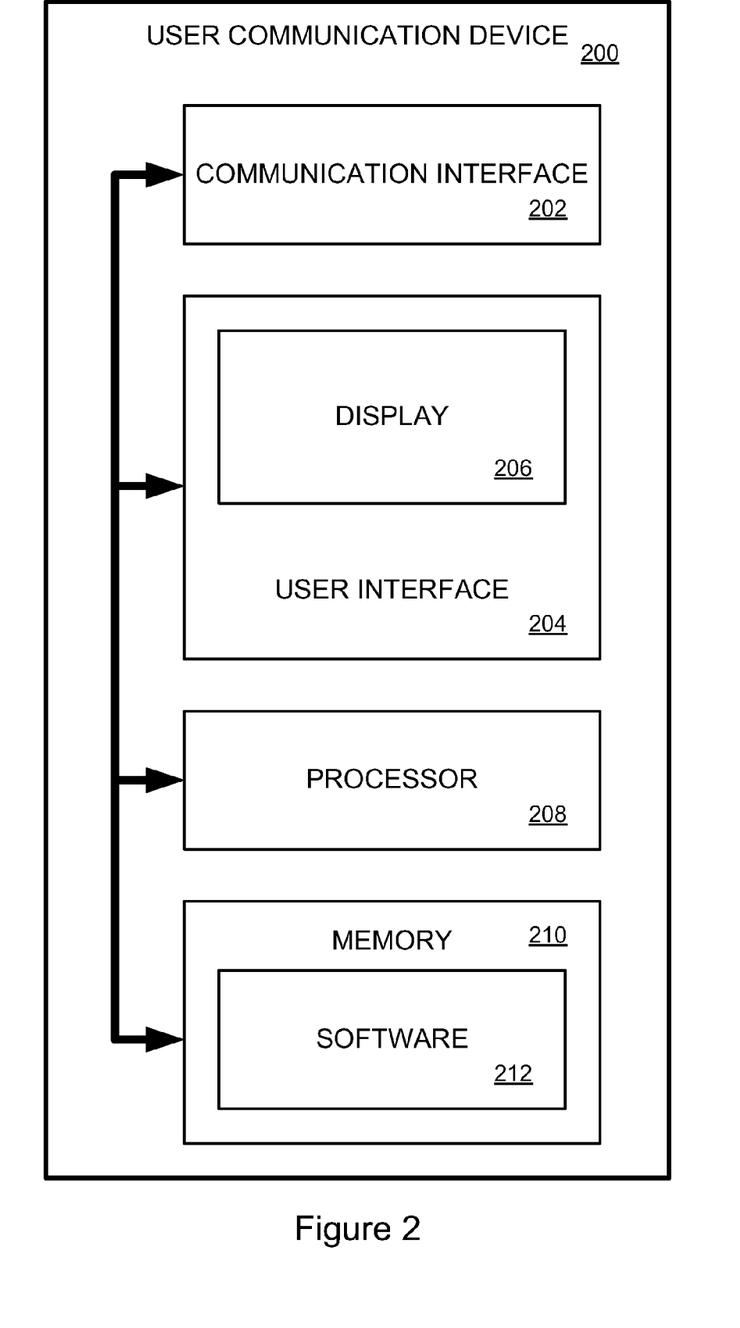
FIG. 2 is a block diagram illustrating a user communication device.

FIG. 2 is a block diagram illustrating a user communication device. In this example user communication device 200, such as that used as calling device 102 in FIG. 1, includes communication interface 202, user interface 204, processor 208, and memory 210. User interface 204 includes display 206, along with other control elements such as keys, buttons, microphones, speakers, switches, or any other control elements allowing a user to control user communication device 200. Communication interface 202 connects user communication device 200 to a communication network such as calling device network 108 illustrated in FIG. 1. This interface may use any of a variety of forms and protocols, such as a wireless connection, or simply a wired telephone line, to connect device 200 to a communication network. Processor 208 is configured to control the operation of user communication device 200 as it completes calls over a communication network. Processor 208 may be configured to perform the encoding and decoding necessary to transmit voice communications over a digital network, thus functioning as a codec. Memory 210 contains software 212 utilized to instruct processor 208 to perform the necessary operations required for communications using device 200.

In an example embodiment memory 210 may contain software 212 configured to cause processor 208 to use the codec chosen for the current communication. Other embodiments may include firmware elements containing one or more codecs. A very wide variety of system architectures are available for use in designing user communication device 200, and the architecture illustrated in FIG. 2 is but one example embodiment of a user communication device 200.

While the example illustrated in FIG. 2 is structured as a handset, other embodiments may include other possible configurations of user communication devices. For example, the user communication device may be any of a wide range of customer premises equipment such as a computer or traditional telephone attached to a WiMAX (Worldwide Interoperability for Wireless Access) modem.

Figure 3:
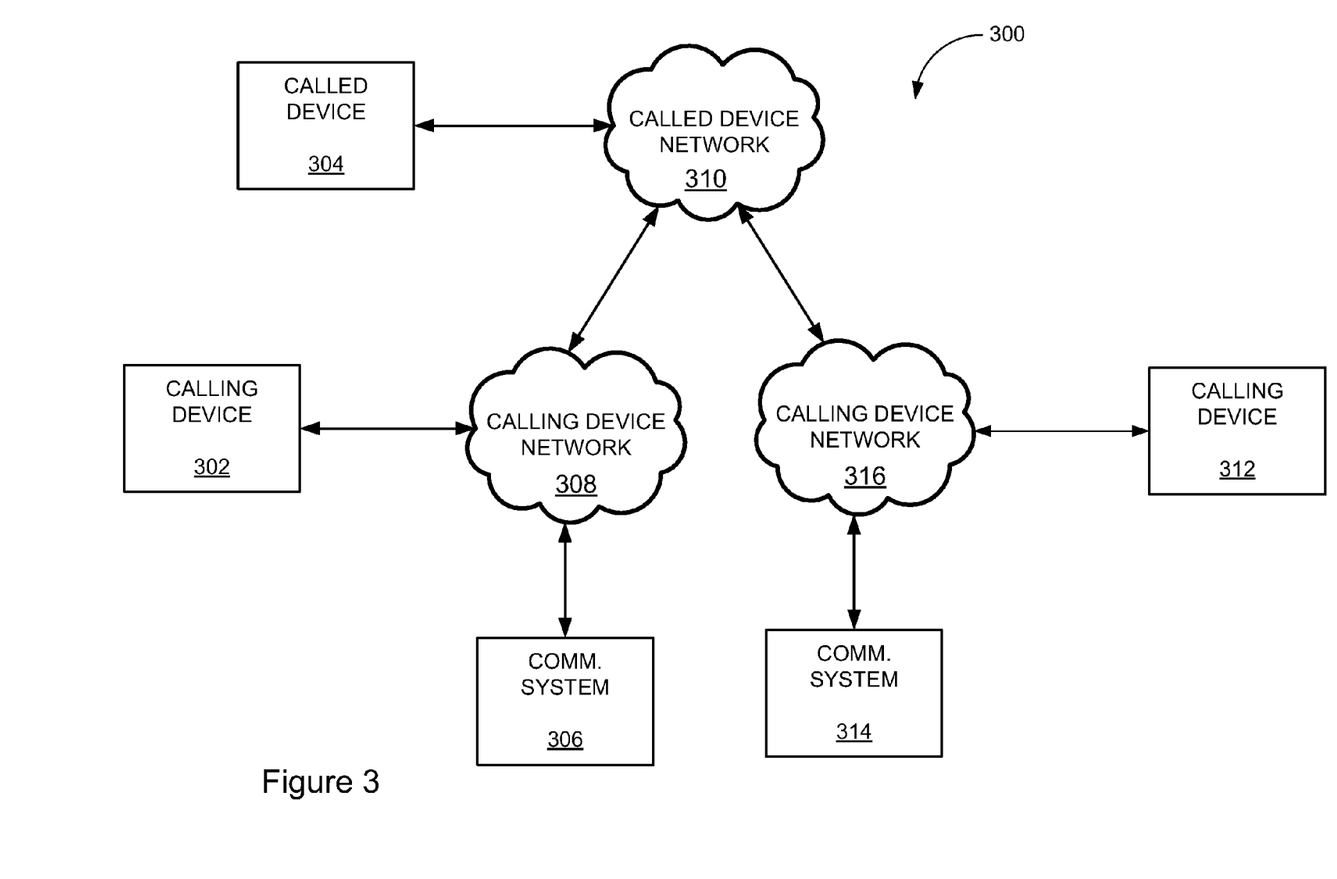
FIG. 3 is a block diagram illustrating a communication network.

FIG. 3 is a block diagram illustrating a communication network. Communication network 300 includes first calling device 302, second calling device 312, called device 304, first calling device network 308, first communication system 306, second calling device network 316, second communication system 314, and called device network 310. Called device network 310 is communicatively coupled with both the first and second calling device networks 308 and 316, and called device 304. The first calling device network 308 is communicatively coupled with first calling device 302 and first communication system 306, while the second calling device network 316 is communicatively coupled with second calling device 312 and second communication system 314. This figure is a simplification of actual networks, and many other couplings, connections, and configurations are possible.

In this example, in the case where calling device 302 and calling device 312 both are calling called device 304 utilizing called device network 310, the optimum destination codec may be different for the two calling devices. For example, if the connection between calling device network 308 and called device network 310 is substantially different from the connection between calling device network 316 and called device network 310, different codecs may be necessary to optimize data transfer along the two different paths. In this case, communication system 306 would send a destination codec to calling device 302 which is different from the destination codec that communication system 314 would send to calling device 312.

Figure 4:
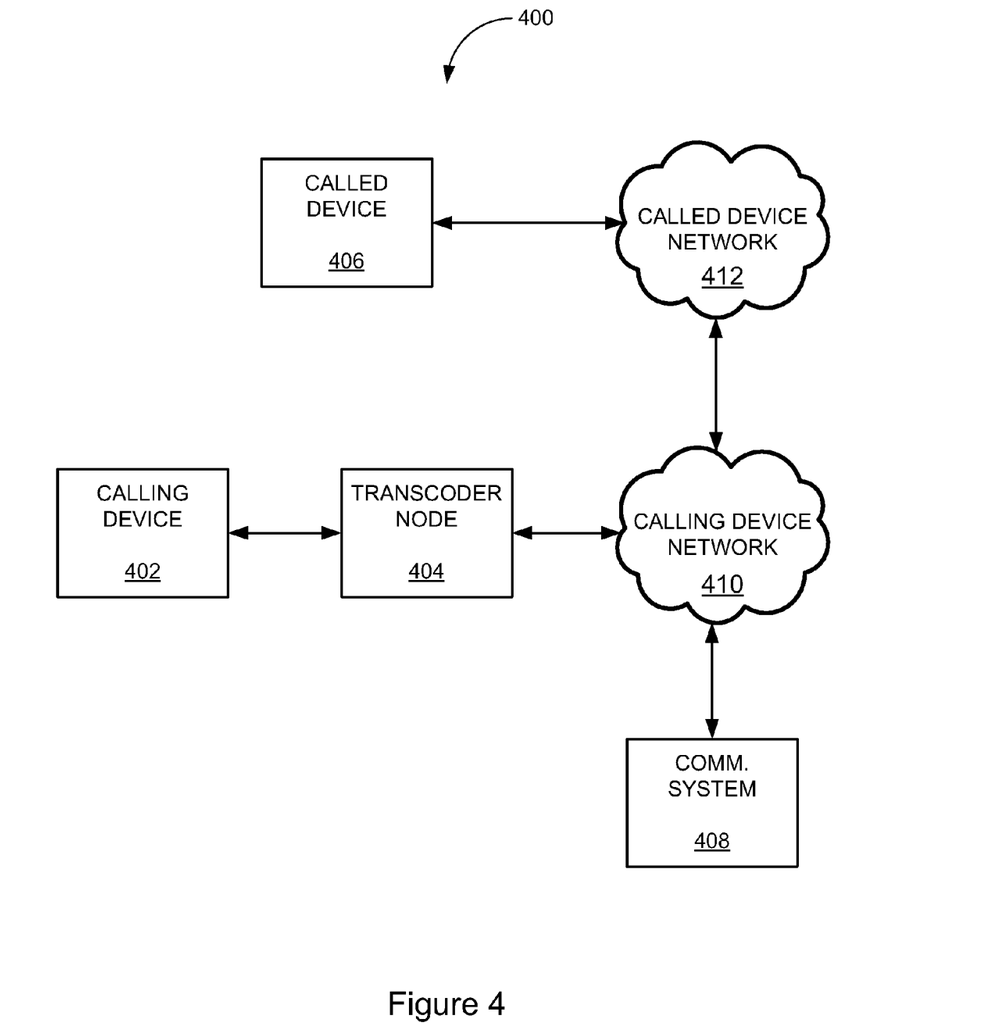
FIG. 4 is a block diagram illustrating a communication network.

FIG. 4 is a block diagram illustrating a communication network. In this example, communication network 400 comprises calling device 402 that is communicatively coupled to calling device network 410. Transcoder node 404 is included between calling device 402 and calling device network 410. Communication system 408 is also communicatively coupled to calling device network 410. Called device 406 is communicatively coupled with called device network 412, which is further communicatively coupled to calling device network 410. The addition of transcoder node 404 to the system allows network 400 to utilize a destination codec for communication between the calling device 402 and the called device 406 even when calling device 402 is unable to use the destination codec. In some examples, a session border controller (or other computer device) is configured to act as transcoder node 404. It receives data from calling device 402 encoded using an originating codec, and transcodes the data using the destination codec.

Figure 5:
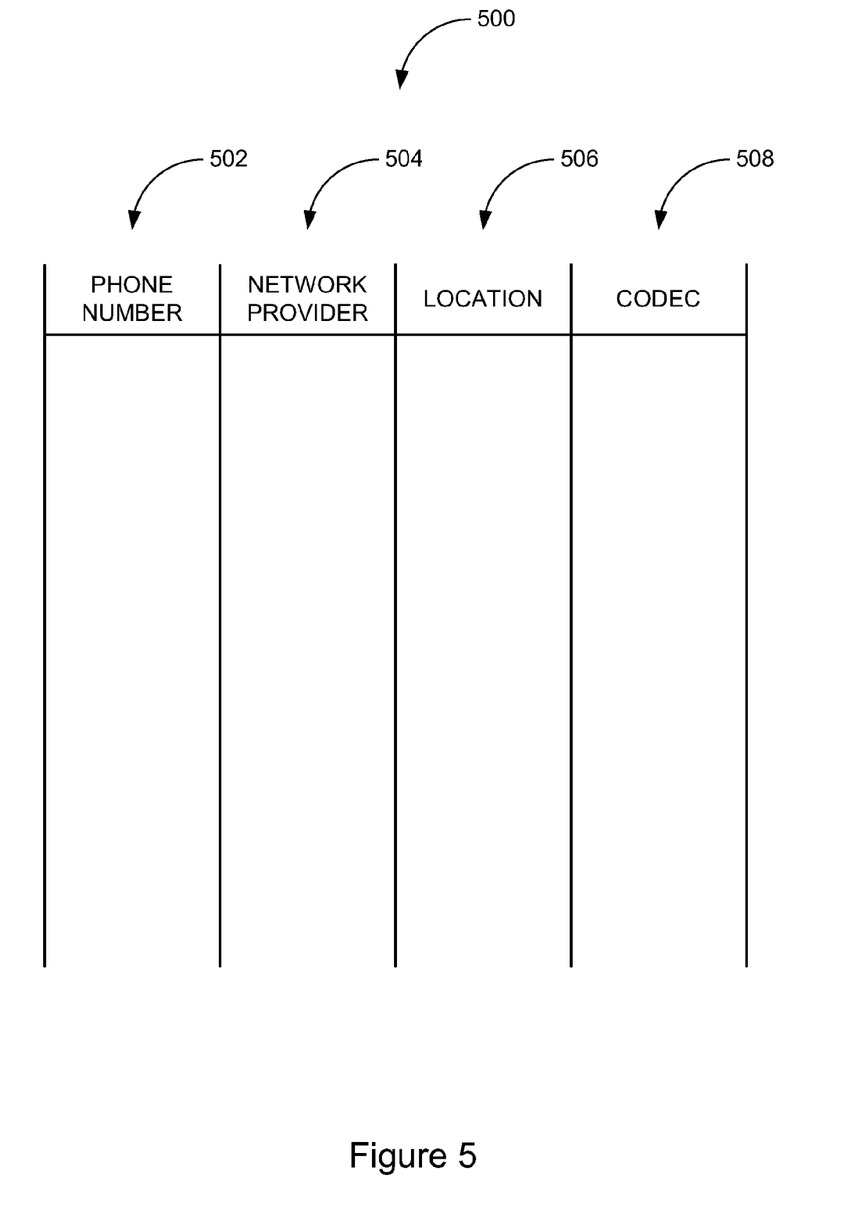
FIG. 5 is an illustration of an example codec table.

FIG. 5 is an illustration of an example codec table 500. This codec table 500 may be stored in memory within a communication system or otherwise made available to a communication system such as those illustrated in FIGS. 1, 3, and 4, and described above. Codec table 500 includes four columns of data: phone number 502, network provider 504, location 506, and destination codec 508. Other codec tables may have different structures and contain differing data categories. Phone number 502 may contain a list of phone numbers of called devices, or a series of ranges of phone numbers correlating to called devices. For example, all numbers with a given prefix may have a single entry in this table if they all have the same optimum destination codec. In this example, when communication system 106 receives a phone number for called device 104 from calling device 102 it retrieves codec table 500 from memory, finds the phone number within codec table 500, determines the optimum destination codec from codec column 508, and sends the identity of the destination codec to calling device 102. Calling device 102 then uses the destination codec within its call to called device 106.

Figure 6:
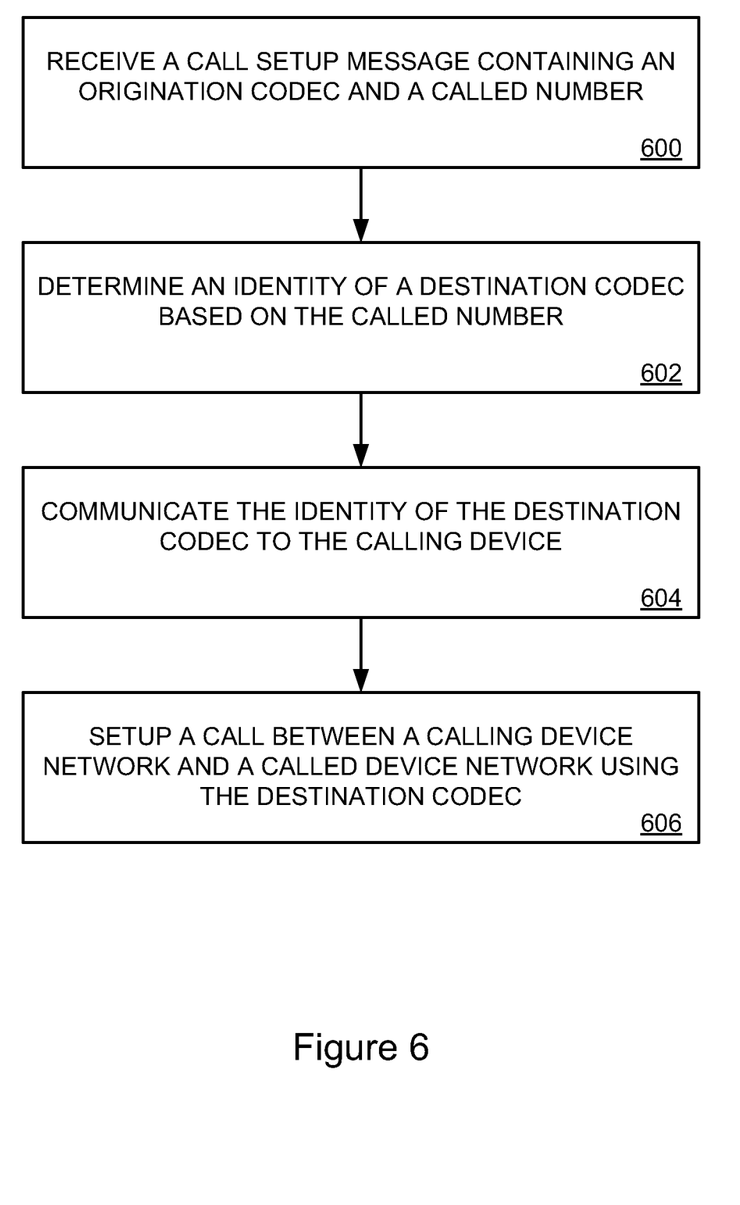
FIG. 6 is a flow diagram illustrating a method of operating a communication network.

FIG. 6 is a flow diagram illustrating a method of operating a communication network. Reference numbers from FIG. 6 are indicated parenthetically below. A communication system receives a call setup message containing an origination codec and a called number from a calling device, (operation 600). The communication system then determines an identity of a destination codec based on the called number, (operation 602). The destination codec may be determined by accessing a codec table 500, such as the one illustrated in FIG. 5, or using any of a variety of other methods for determining an optimum destination codec. Once the identity of the destination codec has been determined, the communication system communicates the identity of the destination codec to the calling device, (operation 604). The communication system then sets up a call between a calling device network and a called device network using the destination codec, (operation 606).

Figure 7:
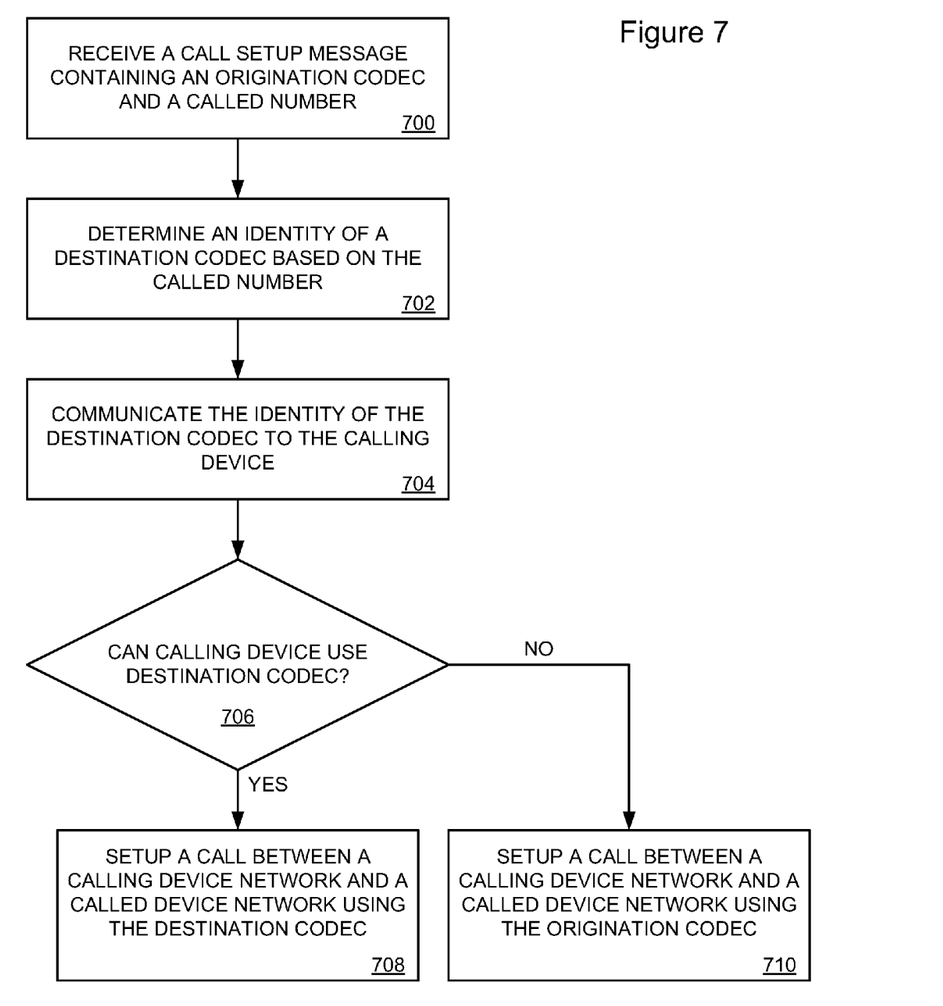
FIG. 7 is a flow diagram illustrating a method of operating a communication network.

FIG. 7 is a flow diagram illustrating a method of operating a communication network. Reference numbers from FIG. 7 are indicated parenthetically below. A communication system receives a call setup message containing an origination codec and a called number from a calling device, (operation 700). The communication system then determines an identity of a destination codec based on the called number, (operation 702). The destination codec may be determined by accessing a codec table 500, such as the one illustrated in FIG. 5, or using any of a variety of other methods for determining an optimum destination codec. Once the identity of the destination codec has been determined, the communication system communicates the identity of the destination codec to the calling device, (operation 704). The communication system then checks to see if the calling device is capable of using the destination codec, (operation 706). If the calling device is capable of using the destination codec, the communication system then sets up a call between a calling device network and a called device network using the destination codec, (operation 708). If the calling device is not capable of using the destination codec, the communication system then sets up a call between the calling device network and the called device network using the origination codec, (operation 710).

Figure 8:
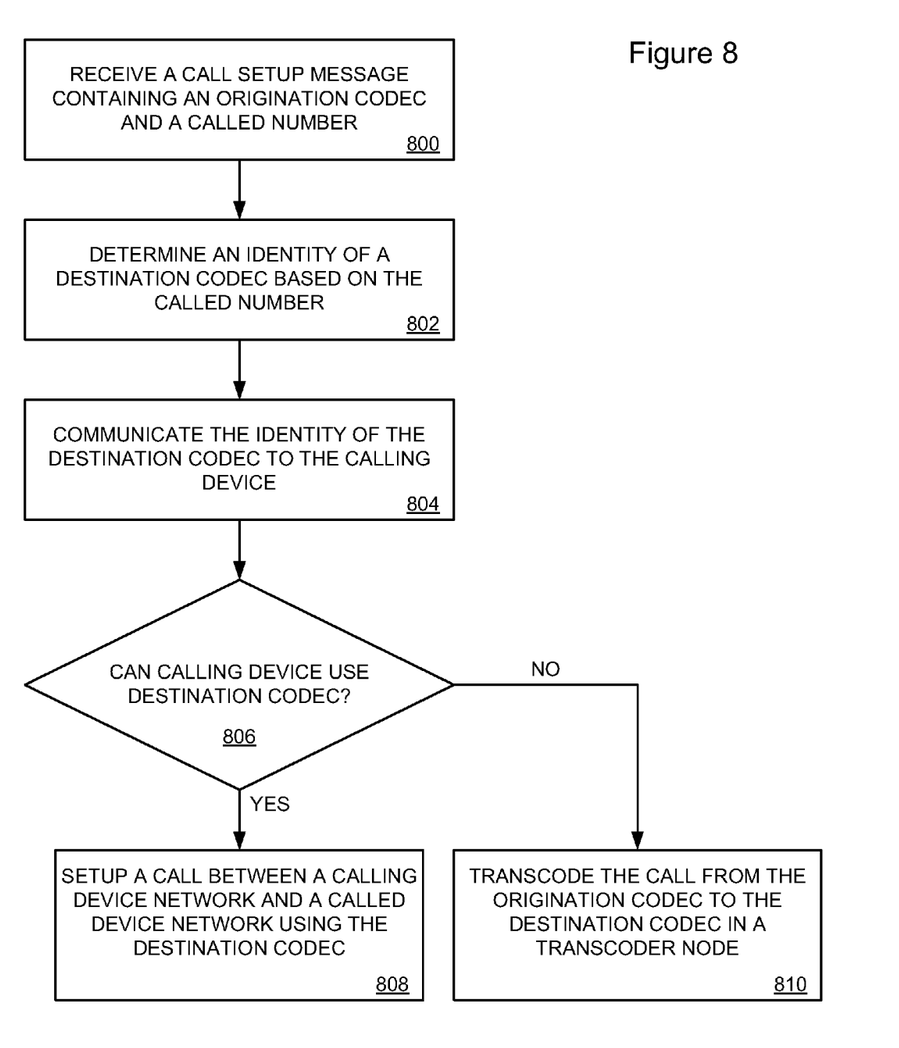
FIG. 8 is a flow diagram illustrating a method of operating a communication network.

FIG. 8 is a flow diagram illustrating a method of operating a communication network. Reference numbers from FIG. 8 are indicated parenthetically below. A communication system receives a call setup message containing an origination codec and a called number from a calling device, (operation 800). The communication system then determines an identity of a destination codec based on the called number, (operation 802). The destination codec may be determined by accessing a codec table 500, such as the one illustrated in FIG. 5, or using any of a variety of other methods for determining an optimum destination codec. Once the identity of the destination codec has been determined, the communication system communicates the identity of the destination codec to the calling device, (operation 804). The communication system then checks to see if the calling device is capable of using the destination codec, (operation 806). If the calling device is capable of using the destination codec, the communication system then sets up a call between a calling device network and a called device network using the destination codec, (operation 808). If the calling device is not capable of using the destination codec, the communication system then sets up a transcoder node to transcode the call from the origination codec to the destination codec, and sets up a call between the calling device network and the called device network using the destination codec, (operation 810).

Figure 9:
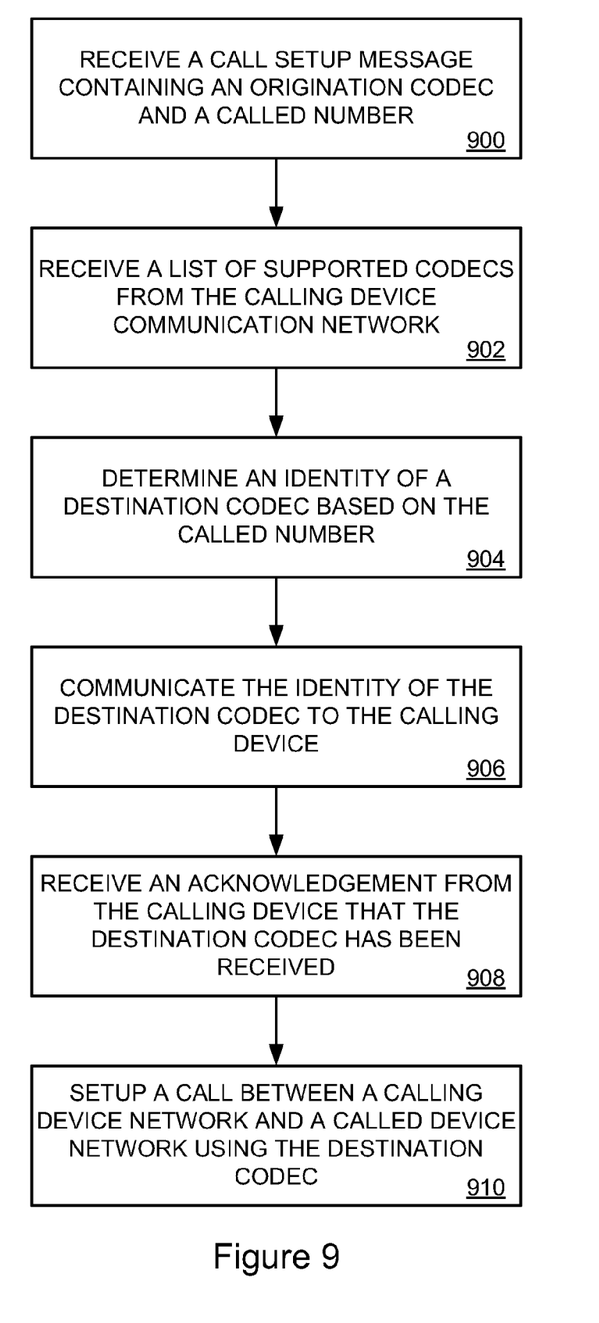
FIG. 9 is a flow diagram illustrating a method of operating a communication network.

FIG. 9 is a flow diagram illustrating a method of operating a communication network. Reference numbers from FIG. 9 are indicated parenthetically below. A communication system receives a call setup message containing an origination codec and a called number from a calling device, (operation 900). The communication system also receives a list of supported codecs from a calling device network, (operation 902). This allows the communication system to select a codec that the calling device is capable of using. The communication system then determines an identity of a destination codec based on the called number, (operation 904). The destination codec may be determined by accessing a codec table 500, such as the one illustrated in FIG. 5, or using any of a variety of other methods for determining an optimum destination codec. Once the identity of the destination codec has been determined, the communication system communicates the identity of the destination codec to the calling device, (operation 906). The calling device then sends an acknowledgement to the communication system indicating that the destination codec has been received, (operation 908). The communication system then sets up a call between a calling device network and a called device network using the destination codec, (operation 910).

Figure 10:
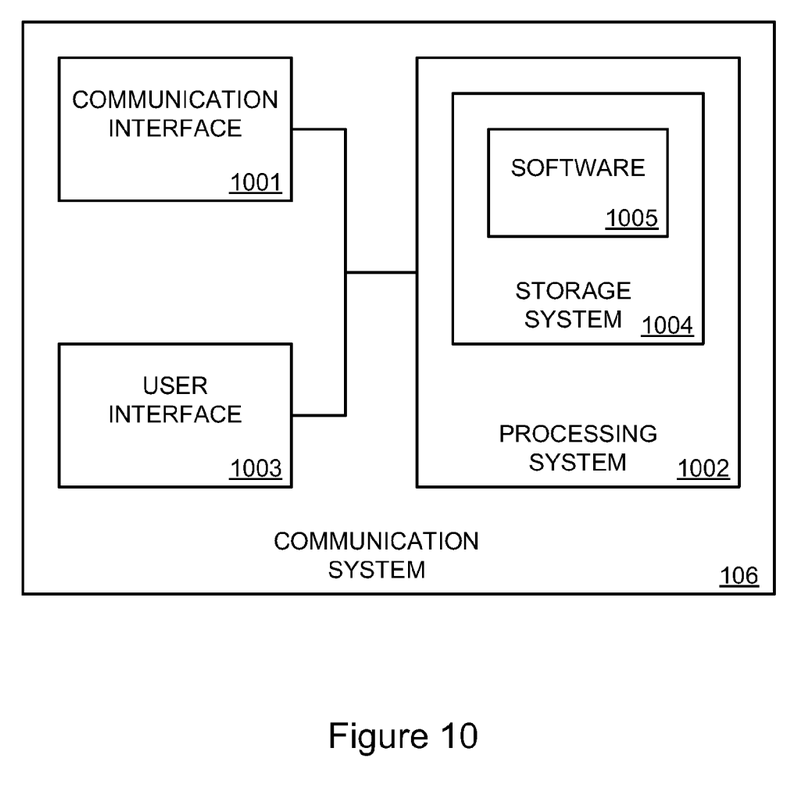
FIG. 10 is a block diagram illustrating a computer system.

FIG. 10 is a block diagram illustrating a computer system operating as communication system 106 illustrated in FIG. 1. Communication system 106 includes communication interface 1001, processing system 1002, and user interface 1003. Processing system 1002 includes storage system 1004. Storage system 1004 stores software 1005. Processing system 1002 is linked to communication interface 1001 and user interface 1003. Communication system 106 could be comprised of a programmed general-purpose computer, although those skilled in the art will appreciate that programmable or special purpose circuitry and equipment may be used. Communication system 106 may be distributed among multiple devices that together comprise elements 1001-1005.

Communication interface 1001 could comprise a network interface, modem, port, transceiver, or some other communication device. Communication interface 1001 may be distributed among multiple communication devices. Processing system 1002 could comprise a computer microprocessor, logic circuit, or some other processing device. Processing system 1002 may be distributed among multiple processing devices. User interface 1003 could comprise a keyboard, mouse, voice recognition interface, microphone and speakers, graphical display, touch screen, or some other type of user device. User interface 1003 may be distributed among multiple user devices. Storage system 1004 could comprise a disk, tape, integrated circuit, server, or some other memory device. Storage system 1004 may be distributed among multiple memory devices.

Processing system 1002 retrieves and executes software 1005 from storage system 1004. Software 1005 may comprise an operating system, utilities, drivers, networking software, and other software typically loaded onto a computer system. Software 1005 could comprise an application program, firmware, or some other form of machine-readable processing instructions. When executed by processing system 1002, software 1005 directs processing system 1002 to operate communication system 106 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method in a communication network for optimizing a codec selection between a calling device communication network and a called device communication network, comprising:

receiving a call set-up message from the calling device communication network wherein the call set-up message comprises an identity of an origination codec and a called number;
utilizing an identity of a called device network owner to determine an identity of a destination codec;
communicating the identity of the destination codec to the calling device communication network; and
establishing a call between the calling device communication network and the called device communication network using the destination codec.

2. The method of claim 1, further comprising:
establishing a call between the calling device communication network and the called device communication network using the origination codec if the calling device communication network cannot support the destination codec.

3. The method of claim 1, wherein the calling device communication network comprises a calling device.

4. The method of claim 1, wherein the calling device communication network comprises a network control element.

5. The method of claim 1, further comprising:
receiving an acknowledgement from the calling device communication network signaling that the destination codec has been established.

6. The method of claim 1, further comprising:
receiving a list of identities of supported codecs from the calling device communication network.

7. The method of claim 6, further comprising:
configuring a transcoder node communicatively coupled to the calling device communication network to transcode from the origination codec to the destination codec, if the destination codec is not on the list of identities of supported codecs.

8. The method of claim 1, wherein a called device associated with the called number comprises a code division multiple access (CDMA) handset.

9. The method of claim 1, wherein the destination codec is selected from a codec table.

10. The method of claim 9, wherein the codec table is populated with codecs selected to optimize use of network resources.

11. The method of claim 1, wherein the destination codec is also determined based upon a voice path to the called device network.

12. An apparatus for optimizing a codec selection between a calling device communication network and a called device communication network, comprising:
a communication system comprising:
a communication interface communicatively coupled with the calling device communication network controlled by a first business entity; and
a processing system communicatively coupled with the communication interface;
wherein the processing system is configured to operate the communication system to:
receive a call set-up message from the calling device communication network through the communication interface, wherein the call set-up message comprises an identity of an origination codec and a called number;
determine an identity of a destination codec based upon a connection between the calling device communication network and the called device communication network controlled by a second business entity;
communicate the identity of the destination codec to the calling device communication network through the communication interface; and
establish a call between the calling device communication network and the called device communication network using the destination codec when the calling device communication network supports the destination codec and using the origination codec when the calling device communication network cannot support the destination codec.

13. The apparatus of claim 12, wherein the processing system is also configured to operate the communication system to:
utilize an identity of a called device network owner to determine the identity of the destination codec.

14. The apparatus of claim 12, wherein the processing system is also configured to operate the communication system to:
receive a list of identities of supported codecs from the calling device communication network through the communication interface.

15. The apparatus of claim 14, wherein the processing system is also configured to operate the communication system to:
configure a transcoder node communicatively coupled to the calling device communication network to transcode from the origination codec to the destination codec, if the destination codec is not on the list of identities of supported codecs.

16. The apparatus of claim 12, wherein the communication system also comprises:
a storage system coupled with the processing system, containing a codec table;
wherein the destination codec is selected from the codec table.

17. A non-transitory computer-readable medium having instructions stored thereon for operating a communication system to optimize a codec selection between a calling device communication network and a called device communication network, wherein the instructions when executed by the communication system, direct the communication system to:
receive a call set-up message from the calling device communication network wherein the call set-up message comprises an identity of an origination codec and a called number;
utilize an identity of a called device network owner to determine an identity of a destination codec;
communicate the identity of the destination codec to the calling device communication network; and
establish a call between the calling device communication network and the called device communication network using the destination codec.

18. The non-transitory computer-readable medium of claim 17, having further instructions directing the communication system to:
establish a call between the calling device communication network and the called device communication network using the origination codec if the calling device communication network cannot support the destination codec.

19. The non-transitory computer-readable medium of claim 17, having further instructions directing the communication system to:
receive a list of identities of supported codecs from the calling device communication network.

20. The non-transitory computer-readable medium of claim 19, having further instructions directing the communication system to:

configure a transcoder node communicatively coupled to the calling device communication network to transcode from the origination codec to the destination codec, if the destination codec is not on the list of identities of supported codecs.

21. The non-transitory computer-readable medium of claim 17, having further instructions directing the communication system to:

select the destination codec from a codec table.

22. The method of claim 7, wherein the transcoder node is not communicatively coupled to the called device communication network or to a called device.

23. The apparatus of claim 15, wherein the transcoder node is not communicatively coupled to the called device communication network or to a called device.

24. The non-transitory computer-readable medium of claim 20, wherein the transcoder node is not communicatively coupled to the called device communication network or to a called device.

\* \* \* \* \*